L. W. SCOTT.
Fitting for Sinks and other Outlets for Waste.
No. 219,988. Patented Sept. 23, 1879.
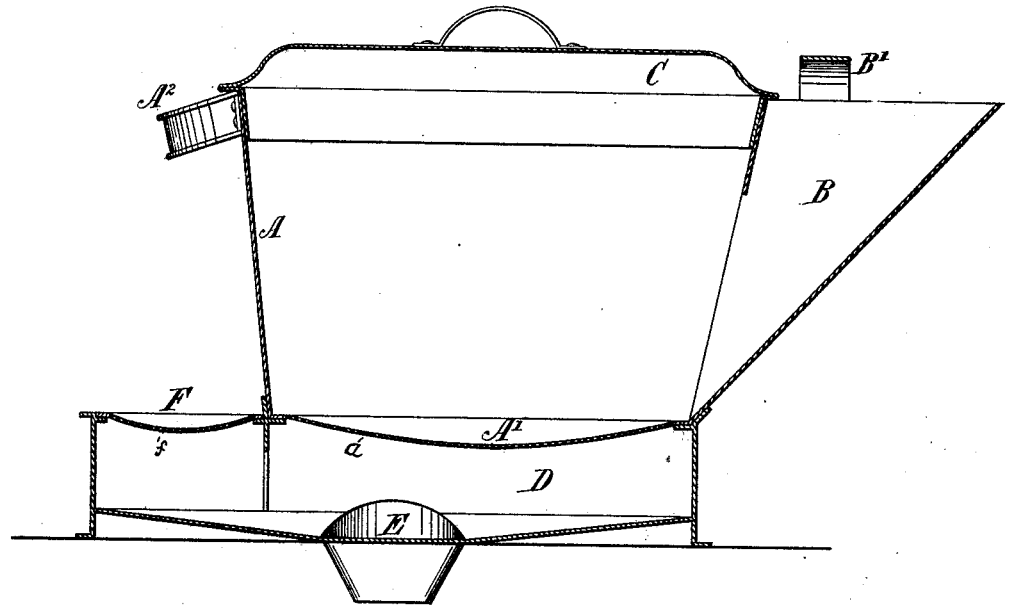
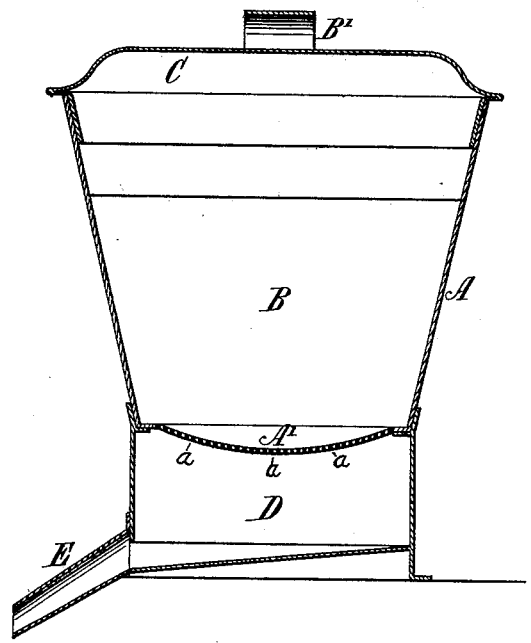

UNITED STATES PATENT OFFICE.

LEMUEL W. SCOTT, OF MONTREAL, QUEBEC, CANADA, ASSIGNOR OF ONE-HALF HIS RIGHT TO SAMUEL CARSLEY, OF SAME PLACE.

IMPROVEMENT IN FITTINGS FOR SINKS AND OTHER OUTLETS FOR WASTE.

Specification forming part of Letters Patent No. 219,988, dated September 23, 1879; application filed July 21, 1879.

*To all whom it may concern:*

Be it known that I, LEMUEL W. SCOTT, of the city of Montreal, in the District of Montreal and Province of Quebec, Canada, have invented certain new and useful Improved Fittings for Sinks and other Outlets for Waste; and I do hereby declare that the following is a full, clear, and exact description of the same.

The object of my invention is to provide an apparatus to be used in connection with a sink, either detached therefrom or fixed therein, for the reception of kitchen-refuse, &c., and which will, while allowing the moisture contained in such refuse to escape and flow off by the waste-pipe of the sink or other outlet, retain all the solid parts until nearly or perfectly dry, when they can be disposed of in any way.

This I propose to do by setting in a shallow dish or vessel, sloping every way to an outlet formed in it, a receiver for the refuse, having a perforated bottom and provided with a cover; but for a fuller comprehension of the invention reference must be had to the annexed drawings, in which—

Figure 1 is a longitudinal vertical section, and Fig. 2 a transverse vertical section, of the apparatus.

Similar letters of reference indicate like parts.

A is the receptacle or receiving-vessel, preferably made wider at the top than at the bottom, of any convenient size and shape, and made of any suitable material—such as tin, copper, sheet-iron, &c. $A^1$ is the bottom of this vessel, sloping all ways to one point, and perforated with any number of apertures, $a$, of the size desired.

B is a spout, either attached or made in one with the vessel A; and $A^2$ $B'$, handles, attached, respectively, to the vessel A and spout B. C is the cover, fitting closely to the vessel, and this may, although not so shown in the drawings, be continued over the spout and hinged, so as to allow of the discharge of the contents of the vessel.

D is the stand or vessel in which the receiver A is set, having its bottom, as shown, sloping from every point to the outlet E, which is preferably so arranged and the apparatus so placed that it will discharge close to the waste-pipe of the sink.

F is a dish or stand, which may hold soap, perforated, as at $f$, with any number of holes, and communicating with the vessel D.

The manner in which my invention is used hardly requires explanation; but it will be sufficient to say that any refuse partly solid and partly fluid is placed in the receptacle A, whence the liquid part drains through the perforated bottom $A^1$ into the vessel D, and passes off by the outlet E. The vessel A may then be lifted off the stand or base and its contents emptied through the spout B and consumed or otherwise disposed of.

Although preferably of some such shape and proportion as shown in the drawings, it must be clearly understood that the apparatus may be altered as regards these points under differing requirements, and although, as before mentioned, generally fixed in or used in connection with a sink, will be found advantageous in all cases where semi-liquid refuse has to be disposed of—such as a trap in a yard, &c. Again, although a dish for soap is shown in connection with the apparatus, this may, if desired, be dispensed with, or, if used, have, in addition thereto, troughs for brushes, &c., all arranged to drain into the vessel D.

The use of my invention will present, from a sanitary point of view, great advantages, as the sink or trap will always remain clear, nothing but fluids being received in it, and the danger of having the waste-pipe choked is entirely done away with and the complete flushing of the waste insured.

Having thus described my invention, what I claim is as follows:

The sink-fitting or slop-hopper composed of the vessel A, having perforated bottom $A^1$ and spout B, and the stand or vessel D, said stand having its bottom sloping all ways toward the outlet E, all substantially as shown, and for the purposes described.

Montreal, July 12, A. D. 1879.

L. W. SCOTT.

Witnesses:
J. B. LEDDEN,
I. E. ALSTON.